Figure 1:
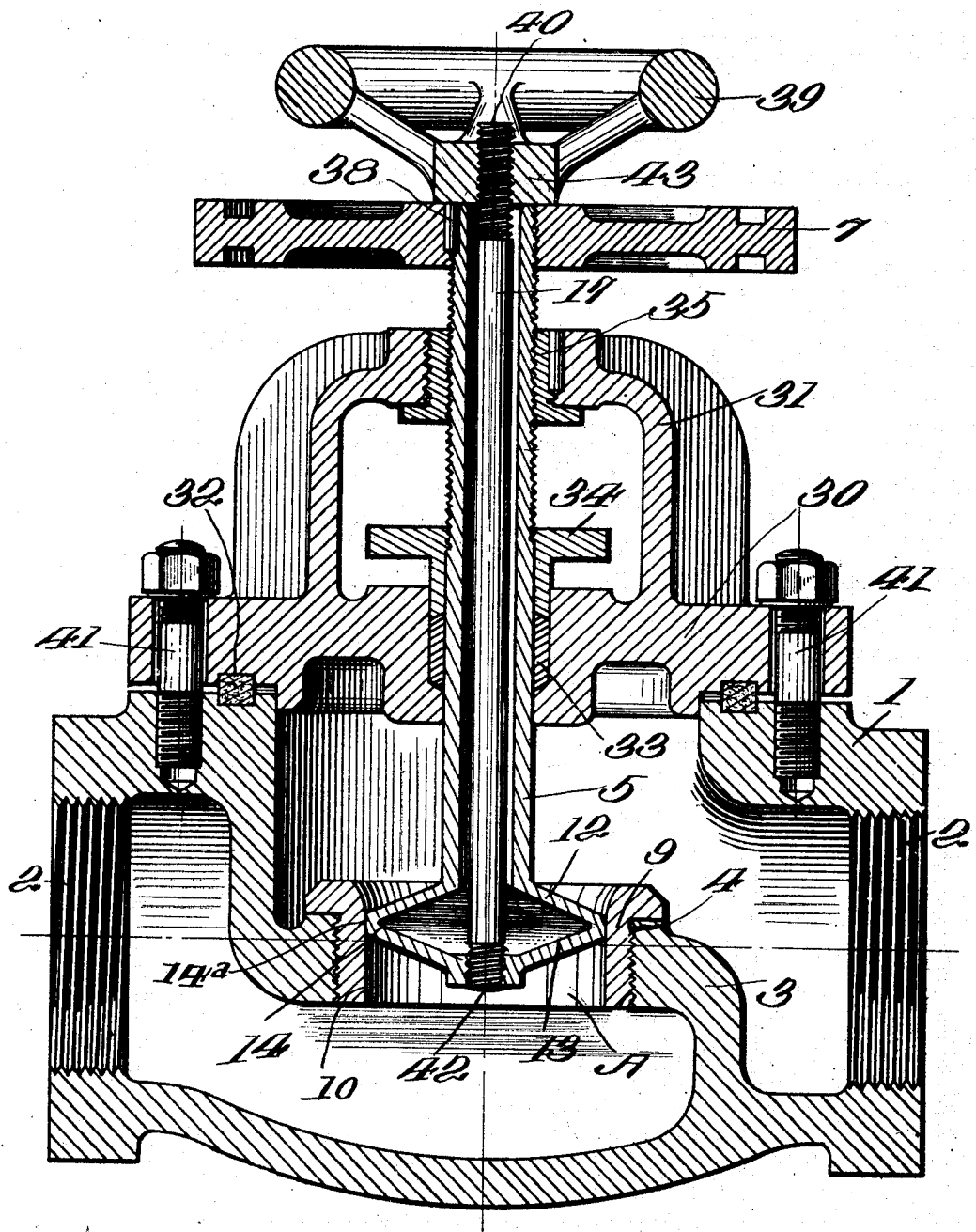

July 16, 1929. W. G. WILSON 1,721,324
VALVE
Filed Jan. 25, 1926 2 Sheets-Sheet 2

INVENTOR.
Wylie G. Wilson
BY James L. Stewart

ATTORNEY.

Patented July 16, 1929.

1,721,324

UNITED STATES PATENT OFFICE.

WYLIE G. WILSON, OF JERSEY CITY, NEW JERSEY, ASSIGNOR TO WILSON RINGS COMPANY, OF JERSEY CITY, NEW JERSEY, A CORPORATION OF NEW JERSEY.

VALVE.

Application filed January 25, 1926. Serial No. 83,420.

This invention is a valve.

In the valve art, it is of fundamental importance that the seal effected by the valve be a tight seal and that the valve be capable of functioning a great number of times without becoming leaky, i. e., it should be repetitive in character, while retaining its capacity to produce a tight seal.

Pursuant to the practices of the prior art, valve seals have been formed by bringing a rigid sealing element into engagement with a rigid seat, or by forming one of these elements of material which is permanently deformed or distorted in producing the seal, or by interposing a gasket, composed of permanently deformable material, intermediate the sealing element and its seat. In the first instance, difficulties are encountered in accomplishing a tight seal because of irregularities in the two surfaces incident to their construction to wear, to the presence of foreign matter between them, or to other causes. In the second and third instances, the deformable bodies very soon become so permanently distorted, as a result of wear, physical deterioration or other cause, that they can no longer produce a tight seal. In all the prior art structures, frequent inspection and repairs, at very considerable annoyance and expense, are necessary in order to maintain tight valves.

With these considerations in mind, the primary object of the present invention is to provide a valve capable of effecting a tight seal throughout long periods of repetitive use and under operating conditions, whereunder the valves of the prior art become ineffective after a relatively short period.

Another object of the invention is to so constitute the sealing element or elements and so operate them, that they may be constructed economically and without that refined workmanship which is usually incident to the grinding of valves and valve seats so that they will cooperate perfectly. The present structures are such that, even though in their primary manufacture they may not be axially co-incident with relation to each other or of truly complementary shape, yet in the operation of the valve, they will adjust themselves to such irregularities and compensate for the same by reason of the material from which they are manufactured and the particular form employed in this connection.

Speaking generally, the valve of this invention embodies a substantially cylindrical port opening, the wall of which constitutes a valve seal. Into and out of this port opening a sealing element is adapted to be moved, with sufficient clearance between the parts to preclude binding between the sealing element and the cylindrical seat, and differential mechanism is associated with the sealing element whereby it may be expanded, while in cooperative relation with the seat, for the purpose of forming a liquid tight impervious seal therewith.

Said sealing element is in the form of two hollow conical sections integrally united at their bases and having a common peripheral sealing surface adapted to cooperate with said cylindrical seat, said conical sections being made of obdurate material as hereinafter defined. I have discovered that a hollow sealing element of the shape described will function with remarkable efficiency in the formation of a tight seal, when such sealing element is constructed from materials which, for the purpose of this invention, are termed "obdurate materials". By this term is meant materials which are bendable, but not easily bent, compressible, but not easily compressed, elastic, but not easily deformed. As examples of obdurate materials, I may mention, without excluding others, iron, steel, hard alloys (such as bronze), glass, ceramic materials, hard rubber, and wood. These materials are in pronounced contradistinction to those, which may be termed "non-obdurate", such as leather, asbestos, soft rubber, soft metals, etc.

The obdurate materials, when employed pursuant to this invention, are operated within their elastic limit, by which I mean that, when embodied in the form of a sealing element and placed under stresses which tend to deform said element, incident to producing a seal, the element shall retain a positive tendency to resume its original form when the stresses are relieved.

I have discovered that when a hollow sealing element of discus shape and of obdurate material is compressed axially, its outer periphery expands substantially in a circle; that is, the expansion is uniform all around when meeting with uniform resistance all around, and, accordingly, its periphery may be utilized to form a fluid tight seal with a suitable seat. It is to be noted that the discus is unbroken and that its periphery should be continuous and not slotted or formed into fingers, otherwise a proper seal could not be produced nor could the sealing element be properly stressed in the sense that is required in this invention to produce the seal.

By "axial compression", I mean pressure exerted upon the sealing element in a direction coaxial with or parallel to its axis, whereby its altitude is diminished and the peripheral diameter of its base increased.

Attention is particularly directed to the fact that the stressing of the sealing element or elements must be within the elastic limit thereof; otherwise, said element would not tend to resume (i. e., tend to spring back to) its normal unsealing form.

The term "elastic limit", as employed in the specification and claims of this application, is so employed to designate that quality or characteristic of the conical forms of obdurate material employed which, when compressed within predetermined limits and then relieved of such compression, will cause said conical form to tend to return to approximately its original form and size. It is intended that such compression shall be within and not beyond the tendency of said conical section to return to its original form and size. That is to say, it is intended that the degree of axial pressure employed shall not be sufficient to break down and destroy the resilient or reactive quality of the conical form herein described. On the contrary, it is the purpose in practising this invention that the degree of compression employed shall be limited to a degree where such reactive characteristic of said conical form will not be seriously affected.

For a better understanding of the operation of the sealing element of hollow discus or composite conical form, it is suggested that it functions like a toggle. This analogy is, of course, not absolute, but when considered in that light it may be helpful to a clearer conception of the operation of the invention. When force is applied to the elbow of a toggle, a greater force is exerted at the ends of the toggle links, and this force increases in proportion as the axial dimension of the toggle, relative to the distance between the ends of the links, becomes less and less.

The sealing element of the present invention may be considered as functioning like a multiplicity of toggles; that is to say, there is a toggle-like action in each diametric plane, and, obviously, there is an infinite number of toggles. When the sealing element is compressed axially, the dimensions of such element and the proportioning of the obdurate material of which it is composed, bring about, within the element, the steadily increasing functional characteristics incidental to toggle action. This action results in a cross axial or radial movement of the sealing element until its periphery or peripheries are forced into tight sealing engagement with cooperating seats. The obdurate element is so proportioned and dimensioned that the seal is effected, in the manner described, before the elastic limit of the element is reached. Accordingly, upon release of the stresses incident to producing the seal, the element tends to autogenously, i. e., automatically, break the seal.

It therefore follows that in a valve embodying this invention, the seal is effected by stressing a sealing element of obdurate material within its elastic limits and that the seal is maintained as long as the element is thus stressed. However, when these stresses are relieved the seal is broken.

Particular attention is called to the fact that the valve seat is substantially cylindrical, since this allows the sealing element to be moved into predetermined relationship with the seat and thereafter stressed into sealing engagement with said seat. The exact position of such engagement is controlled by differential means which, after the sealing element is in the desired position is operable to axially compress the sealing element for the purpose of radially expanding it as described. The exact means employed in this connection may of course vary without departing from the spirit of this invention, but in the preferred, practical form, the sealing element is carried by a tubular valve stem secured to the apex of one of the conical sections of the sealing element and having associated therewith a hand wheel whereby the sealing element can be bodily moved into and out of cooperative relation with the seat. Through the tubular valve stem extends a tension rod secured to the apex of the other conical section and having associated with its free end a threaded member or other suitable means whereby the rod can be placed under tension.

If by this differential mechanism the upper conical section is held by the valve stem against lifting movement and the rod thereupon subjected to tension, it will be apparent that the sealing element will be axially compressed and will be correspondingly radially expanded for the purpose of forcing its periphery into sealing relation with the seat.

Inasmuch as the sealing element is bodily carried by the valve stem, it will be apparent that said sealing element may be moved into any desired position with reference to the seat before placing said element under axial compression to stress it for the purpose of forming the seal and it therefore follows that if one portion of the seat becomes worn, a different portion of the seat may be engaged during the sealing operation, so that a tight, hermetic seal is assured.

The valve of this invention is repetitive in that it can be operated a great number of times without serious distortion of the parts. This is due to the employment of an obdurate sealing element of the form described and to the operation of such element in a manner which permits it to be engaged at will with different portions of the seat. Through the cooperation of these features a highly meritorious valve is obtained.

Experience has demonstrated that a sealing element of the character described will automatically adapt itself to slight irregularities of the seat and that an absolutely tight joint can be produced even though the parts are slightly out of round. Furthermore, it is found that grinding or lapping of the cooperating parts of the seat and sealing element are not required for the formation of a tight seal when the structure of the present invention is utilized. Accordingly, the valve of this invention is not only repetitive, but it is operative to produce tight seals through long periods of time without dismantling for repairs.

Features of the invention, other than those adverted to, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a section through a valve embodying the present invention showing the valve in sealed condition.

Figure 2:
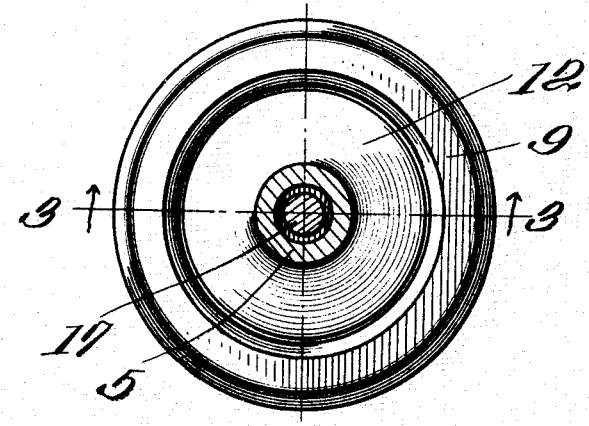
Figure 3:
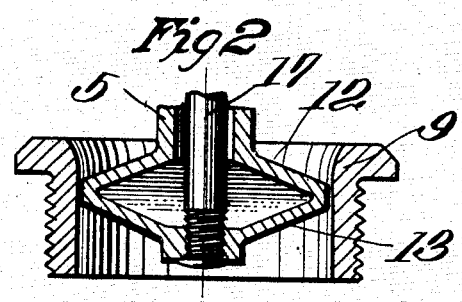
Figure 4:
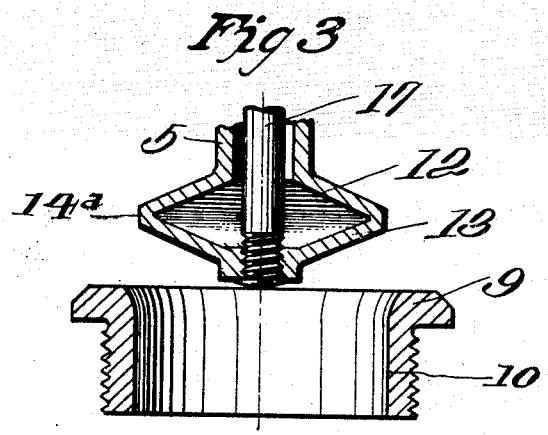

Figure 2 is a top plan view of the valve seat removed from the casing and showing a valve in unstressed condition within the seat; and, Figures 3 and 4 are fragmental sections of the valve seat and sealing element removed from the remainder of the valve construction. In the former of these figures, the sealing element is shown in unstressed condition within the seat, and in the latter figure, the sealing element is shown wholly removed from the seat.

Referring to the drawings, a valve is shown as having a casing 1 provided with interiorly threaded inlet and outlet passages 2 and formed interiorly with a partition or diaphragm 3 having an opening 4. A seat ring 9 is threaded into this opening and has a cylindrical port opening A, the wall 10 of which forms the valve seat. The valve is provided with a suitable bonnet 30 secured to the body of the valve casing by stud bolts 41 and on the bonnet is formed a rigid yoke 31 through which the valve stem 5 is threaded. The valve stem works through a gland having packing 33 and a gland nut 34 for precluding leakage at this point.

The valve stem 5 is of hollow tubular form and with its lower end is associated the sealing element 14. This sealing element is shown as integral with the valve stem, although, in practice, it may be separate and secured thereto. In any event, the sealing element is of substantially discus form and is constructed and embodies an upper hollow conical section 12 and a lower conical section 13, joined together at their bases to provide a common peripheral edge 14ª. Extending coaxially through the hollow valve stem is a rod 17, the lower end 42 of which is secured to the apex of the lower conical section 13 and the upper end of which is threaded and extends beyond the upper end of the valve stem, as shown at 40. The upper end of the valve stem carries a hand wheel 7 keyed thereto by a pin 38, and the upper end of the rod 17 carries a nut 43 which constitutes the hub of a hand wheel 39. The lower face of the hub 43 bears against the upper face of the hub of the hand wheel 7.

With this arrangement of parts, it will be manifest that the rotation of the hand wheel 7 will, by virtue of the threaded connection of the stem with the yoke, cause the sealing element to be raised into the position of Figure 4, when it is desired to permit the flow of fluid through the valve, while rotation in a counter direction will cause the sealing element to be lowered into the position of Figure 3.

It will be noted from these figures that there is sufficient clearance between the sealing element and the seat to permit these movements without binding. During these operations, moreover, the rod 17 and the hand wheel 39 are bodily carried with the sealing element and its stem without any relative rotation between the hand wheels 39 and 7.

When it is desired to seal the port opening A, the sealing element is moved into the position of Figure 2 and thereafter the hand wheel 39 is rotated to place the rod 17 under tension and to draw said rod in an upward direction. As a result of this operation, the apex of the lower conical section 13 is drawn upwardly while the valve stem 5 holds the apex of the upper conical section 12 against movement. The sealing element is of obdurate material as described and it therefore follows that as a result of these operations, the sealing element will be axially compressed and the altitude of each conical section will be correspondingly diminished.

As a result of the stresses to which the sealing element is thus subjected, its periphery will be expanded from the loose fitting condition of Figure 2 to a tight sealing relationship with the seat as shown in Figure 1. The sealing element will be maintained under the stresses referred to so long as the seal is continued, but as soon as the hand wheel 39 is rotated in a counter direction to relieve the tension on the rod 17, the stresses which have maintained the seal will be simultaneously relieved and the sealing element will, by virtue of the obdurate material of which it is formed and of the conformation described, autogenously spring away from the tight engagement with the seat and reassume substantially that relationship with the seat as is shown in Figure 2. The hand wheel 7 may thereupon be rotated to lift the sealing element out of cooperative relation with the seat and into substantially the position of Figure 4 to permit the flow of the fluid through the valve in an unobstructed manner.

It thus appears that the valve stem 5 and the rod 17, together with the two hand wheels 7 and 39 constitute collectively differential mechanism, by which the sealing element may be bodily moved into the desired cooperative relation with the seat and thereafter held in substantially stationary position while subjected to the stresses necessary to effect the seal at the points selected. Inasmuch as the sealing element is capable of engagement with any portion of the length of the seat, the operator may move the sealing element into the position desired and thereupon produce the seal at this point. This arrangement therefore permits the selection of an unworn portion of the seat for the formation of the seal and greatly minimizes repair and maintenance costs.

The foregoing detailed description sets forth the invention in its preferred practical form, but inasmuch as details of construction may be varied without departing from this invention, the invention is to be considered as fully commensurate with the appended claims.

Having thus fully described the invention, what I claim as new and desire to secure by Letters Patent is:

1. In a valve; a substantially cylindrical seat, a hollow valve stem provided at one end with a sealing element in the form of two hollow conical sections integrally united at their bases and having a common peripheral sealing surface adapted to cooperate with said seat, said conical sections being formed of obdurate material, means to move the stem axially to position the sealing element loosely within the seat at a predetermined position longitudinally of the seat, and means extending through the valve stem to the exterior of the valve casing to place the sealing element under axial compression for the purpose of radially expanding it into sealing relation with the seat.

2. In a valve, a substantially cylindrical seat, a sealing element in the form of two hollow conical sections integrally united at their bases and having a common peripheral sealing surface adapted to cooperate with said seat, said conical sections being formed of obdurate material adapted to fit loosely into the seat, and means operable from one and the same side of the valve for moving the sealing element into the desired position within the seat and thereafter axially compressing said element for the purpose of radially expanding it into tight sealing engagement with the seat.

3. In a valve, a valve casing including a bonnet and having an opening to be sealed, a sealing element in the form of two hollow conical sections integrally united at their bases and having a common peripheral sealing surface, adapted to cooperate with said opening to be sealed, said conical sections being formed of obdurate material, said sealing element having a normal diameter to loosely occupy the opening, and means carried wholly by the bonnet for moving the sealing element into a position within the opening for applying axial compression to the sealing element to radially expand it into engagement with the wall of the opening.

Signed by me at Jersey City, N. J., this 29th day of December, 1925.

WYLIE G. WILSON.